United States Patent [19]
Peting et al.

[11] Patent Number: 6,090,180
[45] Date of Patent: Jul. 18, 2000

[54] CUPOLA EMISSION CONTROL SYSTEM AND METHOD

[75] Inventors: Robert G. Peting, Oak Forest; Gregory K. Qualizza, Orland Park, both of Ill.; Craig E. McNally, Bordentown; Mitchell E. Kidd, Mt. Holly, both of N.J.

[73] Assignee: AMSTED Industries Incorporated, Chicago, Ill.

[21] Appl. No.: 09/124,609

[22] Filed: Jul. 29, 1998

[51] Int. Cl.[7] ...................................................... C21B 7/24
[52] U.S. Cl. .............................. 75/375; 75/381; 75/385; 110/191; 266/80; 266/99; 266/197; 266/900
[58] Field of Search ............................ 75/375, 381, 385; 266/80, 99, 197, 900; 110/191

[56] References Cited

U.S. PATENT DOCUMENTS

| | | |
|---|---|---|
| 4,909,160 | 3/1990 | Frick et al. ............................. 110/191 |
| 5,397,109 | 3/1995 | Wilson et al. ........................... 266/900 |
| 5,632,953 | 5/1997 | Feustel et al. ........................... 266/197 |

*Primary Examiner*—Melvyn Andrews
*Attorney, Agent, or Firm*—Edward J. Brosius; F.S. Gregorczyk; Stephen J. Manich

[57] ABSTRACT

A cupola emission control system is provided that includes both improved physical emission control equipment and improved controls for operating such equipment. The physical emission control improvements include an orifice ring of restricted diameter above the cupola main afterburners to improve the turbulence of the air in the upper cupola area to allow improved combustion of carbon monoxide. Further, twin venturis are provided with improved air passage control equipment to affect the temperature in the upper cupola combustion area. Further, an improved control system is provided whereby actual time calculations are made for remaining emission permitted amounts of certain pollutants, mainly carbon monoxide, and real time adjustments are made for cupola operation to assure compliance with such permitted emission limits.

28 Claims, 10 Drawing Sheets

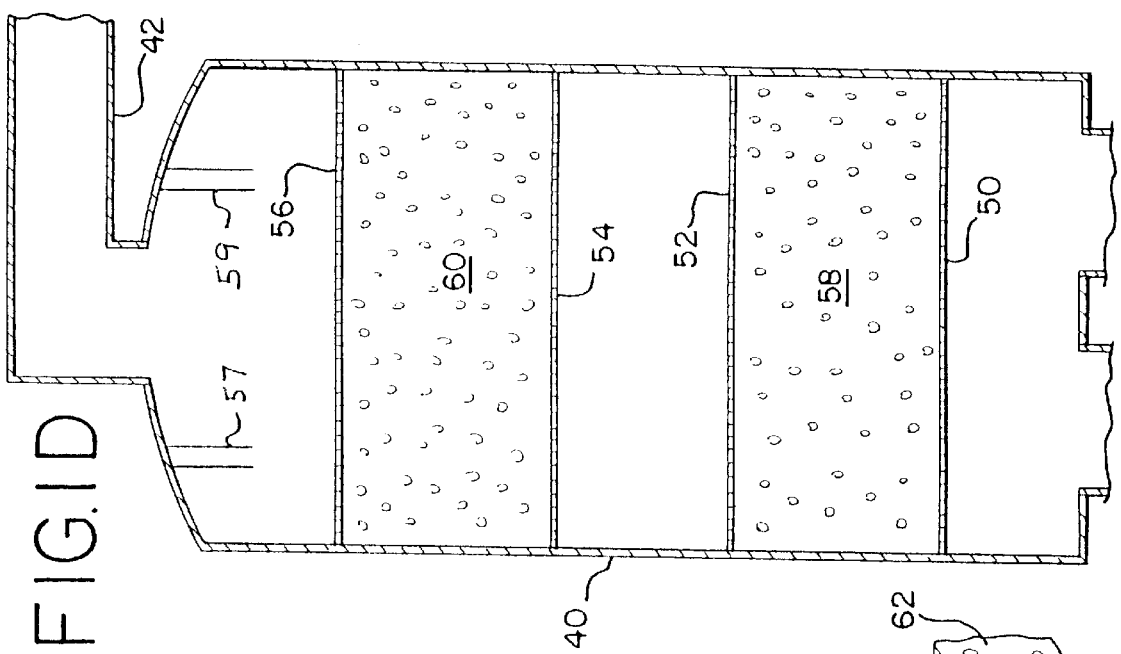
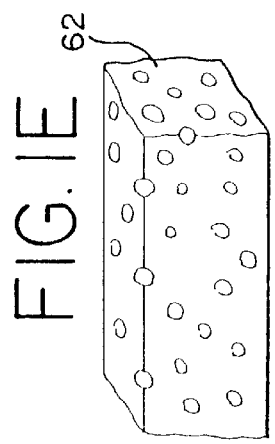
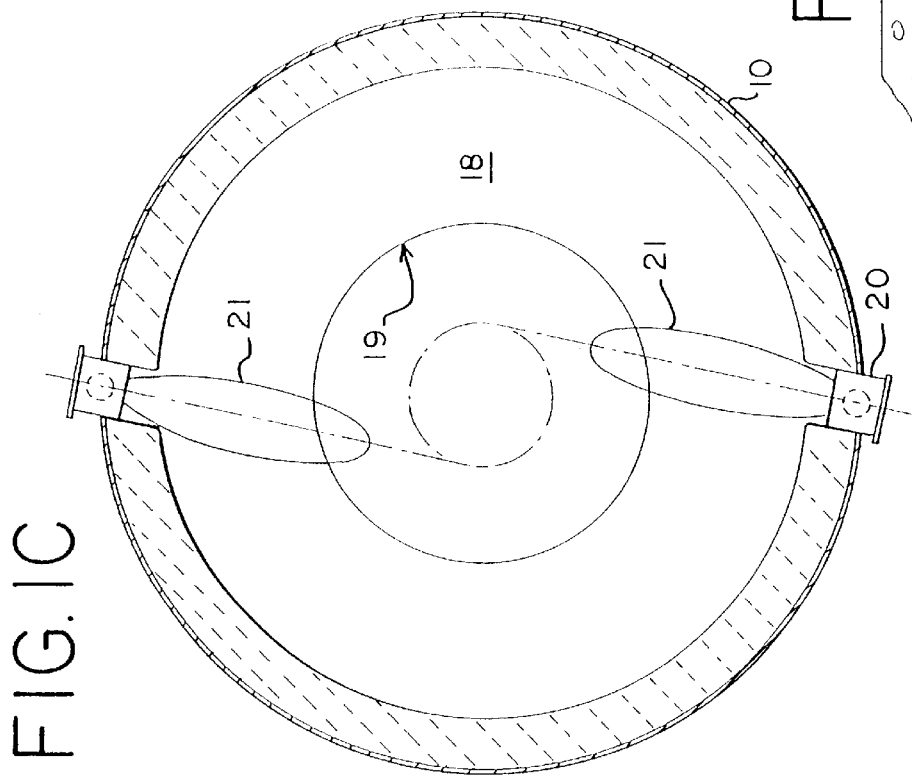

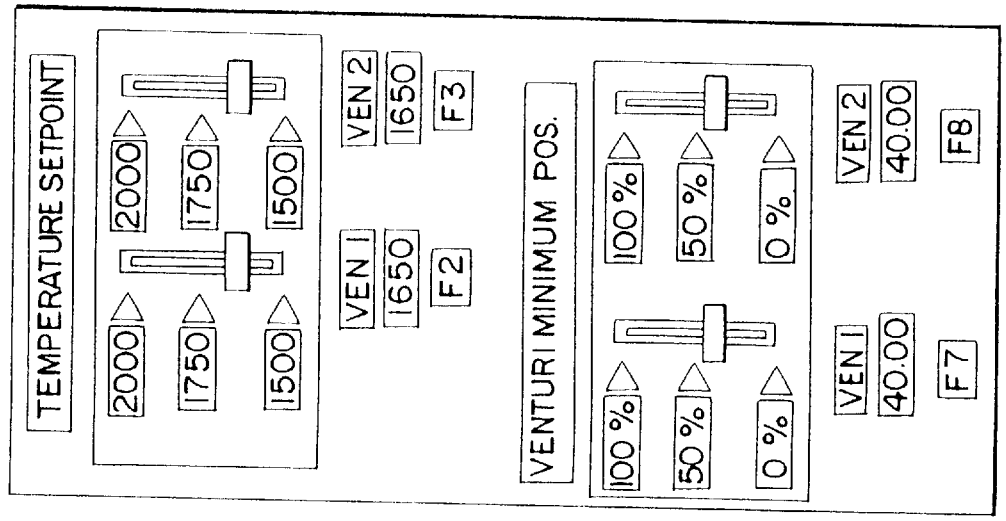
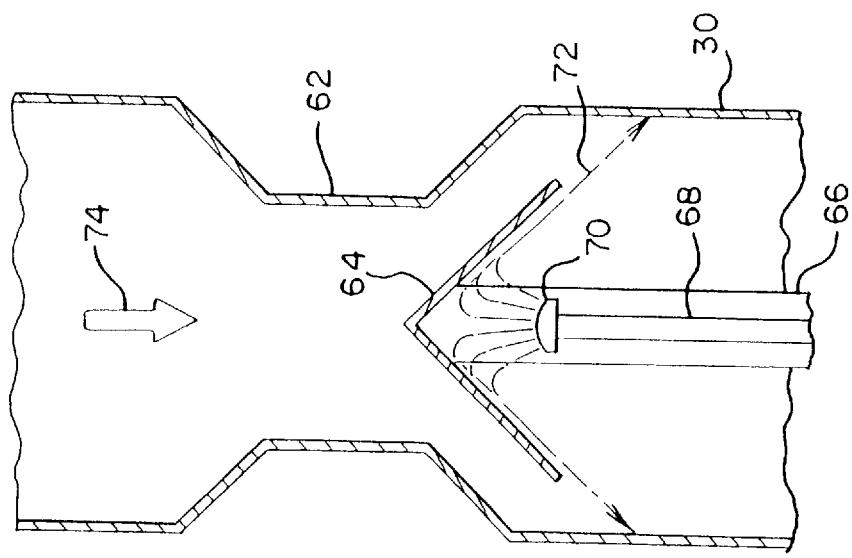

FIG. 8

| \ | DEMAND LIMITING CO EXAMPLE | | |
|---|---|---|---|
| CO MIN AVG | CO PPM LEFT | MINUTES LEFT | TARGET PPM |
| 500 | 150000 | 60 | 2500 |
| 500 | 149500 | 59 | 2534 |
| 400 | 149000 | 58 | 2569 |
| 300 | 148600 | 57 | 2607 |
| 600 | 148300 | 56 | 2648 |
| 400 | 147700 | 55 | 2685 |
| 800 | 147300 | 54 | 2728 |
| 1200 | 146500 | 53 | 2764 |
| 3000 | 145300 | 52 | 2794 |
| 4500 | 142300 | 51 | 2790 |
| 500 | 137800 | 50 | 2756 |
| 600 | 137300 | 49 | 2802 |
| 300 | 136700 | 48 | 2848 |
| 400 | 136400 | 47 | 2902 |
| 200 | 136000 | 46 | 2957 |
| 85 | 135800 | 45 | 3018 |
| 1700 | 135715 | 44 | 3084 |
| 250 | 134015 | 43 | 3117 |
| 65 | 133765 | 42 | 3185 |
| 1400 | 133700 | 41 | 3261 |
| 2500 | 132300 | 40 | 3308 |
| 3500 | 129800 | 39 | 3328 |
| 1600 | 126300 | 38 | 3324 |
| 1400 | 124700 | 37 | 3370 |
| 1800 | 123300 | 36 | 3425 |
| 2000 | 121500 | 35 | 3471 |
| 10000 | 119500 | 34 | 3515 |
| 15000 | 109500 | 33 | 3318 |
| 20000 | 94500 | 32 | 2953 |
| 16000 | 74500 | 31 | 2403 |
| 14000 | 58500 | 30 | 1950 |
| 10000 | 44500 | 29 | 1534 |
| 1000 | 34500 | 28 | 1232 |
| 5000 | 33500 | 27 | 1241 |
| 500 | 28500 | 26 | 1096 |
| 1400 | 28000 | 25 | 1120 |
| 1300 | 26600 | 24 | 1108 |
| 2500 | 25300 | 23 | 1100 |
| 1600 | 22800 | 22 | 1036 |
| 5000 | 21200 | 21 | 1010 |
| 4000 | 16200 | 20 | 810 |
| 500 | 12200 | 19 | 642 |
| 400 | 11700 | 18 | 650 |
| 350 | 11300 | 17 | 665 |
| 1400 | 10950 | 16 | 684 |
| 700 | 9550 | 15 | 637 |
| 900 | 8850 | 14 | 632 |
| 1400 | 7950 | 13 | 612 |
| 2500 | 6550 | 12 | 546 |
| 1400 | 4050 | 11 | 368 |
| 500 | 2650 | 10 | 265 |
| 2500 | 2150 | 9 | 239 |
| 0 | -350 | 8 | -44 |
| 0 | -350 | 7 | -50 |
| 0 | -350 | 6 | -58 |
| 0 | -350 | 5 | -70 |
| 0 | -350 | 4 | -88 |
| 0 | -350 | 3 | -117 |
| 0 | -350 | 2 | -175 |
| 0 | -350 | 1 | -350 |

2500 PPM × 60 MIN = 50,000 PPM/hr
TARGET = CO PPM LEFT/MINUTES LEFT
TARGET = WHAT WE MUST RUN @ FOR BALANCE OF HOUR AND PASS.
TARGET DECREASES AS CO MIN AVG INCREASES AND CO PPM LEFT DECREASES. MAGNITUDE OF CHANGE DEPENDS ON MINUTES LEFT.

SHOULD HAVE BEGUN ORDERLY SHUTDOWN HERE TO INCREASE TARGET AND WENT TO SPILL HERE TO SAVE THE HOUR!

TARGET EXCEEDED CO PPM LEFT AVERAGED OVER REMAINING 8 MIN RESULTING IN 1 HOUR FAILURE.

FLORENCE EMISSION SYSTEM CONTROL BLOCK DIAGRAM

CUPOLA EMISSION CONTROL SYSTEM AND METHOD

BACKGROUND OF THE INVENTION

The present invention provides an improved emission control system and, more particularly, improvements to the upper cupola combustion area and the venturi scrubbers and a control system for operating such emission control equipment.

Cupola emission control systems utilizing afterburners and scrubbers are known. The afterburners are typically used to combust and convert carbon monoxide to carbon dioxide and water vapor. Such afterburners are usually placed in the upper stack area of the cupola. However, recent environmental operating permits have greatly decreased the amount of allowable carbon monoxide emissions and accordingly the design and efficiency of such afterburner systems has had to be improved.

Further, particulate removal from the combustion gasses of operating a cupola is typically accomplished by the use of a wet scrubber or a baghouse. Such a wet scrubber usually comprises an arrangement wherein exhaust emissions are drawn through a spray water screen to thereby agglomerate and impinge the particulate materials into the water screen for subsequent collection as emission control sludge. Improved operation of such scrubbing equipment has also been dictated by recent lessened emission allowable emission limitations in facility operating permits.

Another aspect of such facility operating permits is the need for continuous emission monitoring and compliance. Such continuous emission monitoring typically requires the real time measurement of emissions in the form various monitored pollutants, chiefly carbon monoxide and indicator parameters such as temperature. It is critical for the operation of cupola and its associated emission control equipment to be able to respond to and adjust operations to assure compliance with such permit limitations requiring continuous emission monitoring.

Accordingly, it is an object of the present invention to provide an improved cupola emission control system including afterburners and a venturi scrubber.

It is also an object of the present invention to provide an improved control system for such cupola emission control system.

SUMMARY OF THE INVENTION

The present invention provides an improved cupola emission control system. The physical system itself is improved with the combustion chamber in the upper cupola stack being redesigned to provide more complete combustion and conversion of carbon monoxide to carbon dioxide and water vapor. Afterburners are utilized to heat air in the upper combustion chamber to an ideal combustion temperature of about 1650° F. However, time in the combustion area, turbulence of the air in the combustion chamber as well as temperature all contribute to the complete or nearly complete combustion of the carbon monoxide. The time aspects are accomplished by a general lengthening of the combustion chamber itself. The turbulence of the air is accomplished mainly by the addition of an orifice ring that provides a restriction in air flow upwardly in the combustion chamber such that air exiting the orifice ring and passing pilot burners will be swirling and subjected to complete or nearly complete combustion.

The physical improvements to the emission control system also comprise the utilization of one or ideally two parallel venturi scrubbers. Such venturi scrubbers include restricting cones that can be operated to impinge on a restricted area forming the venturi itself. Water sprays are provided against the concave portion of the cones to form water curtain sprays. The stack gasses from the cupola itself containing particles of air contaminants are passed through or more correctly drawn through the water curtains thereby washing or scrubbing the particles out of the air flow. This is where the major particle removal for emission control purposes is accomplished.

Further, a demister or water separator is provided that comprises two sections of multi-surfaced and porous structures. These structures accomplish both a nearly complete water removal from the air stream through the water separator as well as the final temperature reduction.

An improved control system is also provided for the cupola emission control system. In particular, the venturi impinging cones are controlled based on the cupola upper stack temperature. When such temperature is either too low or too high, the venturi impinging cones are adjusted to allow for either a lesser or greater air draw through the cupola to thereby either increase or decrease the upper stack temperature to near the ideal carbon monoxide combustion temperature of 1650° F.

Further, the actual carbon monoxide emitted through the exhaust stack of the emission control system is also monitored. Depending on the value of such carbon monoxide, the cupola operation is measured against the allowed permitted limit. If such actual carbon monoxide emissions are in given fractional time periods greater than the overall averaged time period permit limit, adjustments are made to the cupola operation to lessen production and thereby generation of carbon monoxide. Such adjustments usually include decreasing the tuyere fed hot air, tuyere fed oxygen injection, or hot blast air. It is also possible to increase cupola operation if the fractional carbon monoxide readings are less than the hourly limit such that an excess of allowable emissions remains in the fraction of the averaging time period, usually one hour, remaining. Such adjustments to the cupola operation would be to increase tuyere fed hot air, tuyere fed oxygen injection or hot blast air.

BRIEF DESCRIPTION OF THE DRAWINGS

In the drawings;

FIG. 1C is a cross sectional diagram of the upper stack of the cupola showing the pilot burners and the orifice ring;

FIG. 1D is a cross sectional view of the water separator;

FIG. 1E is a perspective view of a porous component element of the water separator;

FIG. 2 is a cross sectional view of a portion of the venturi scrubber;

FIG. 3 is a diagram of the computer screen showing the cupola upper stack temperature and venturi positions;

FIG. 8 is a table of calculated carbon monoxide target levels;

DETAILED DESCRIPTION

Figure 1:
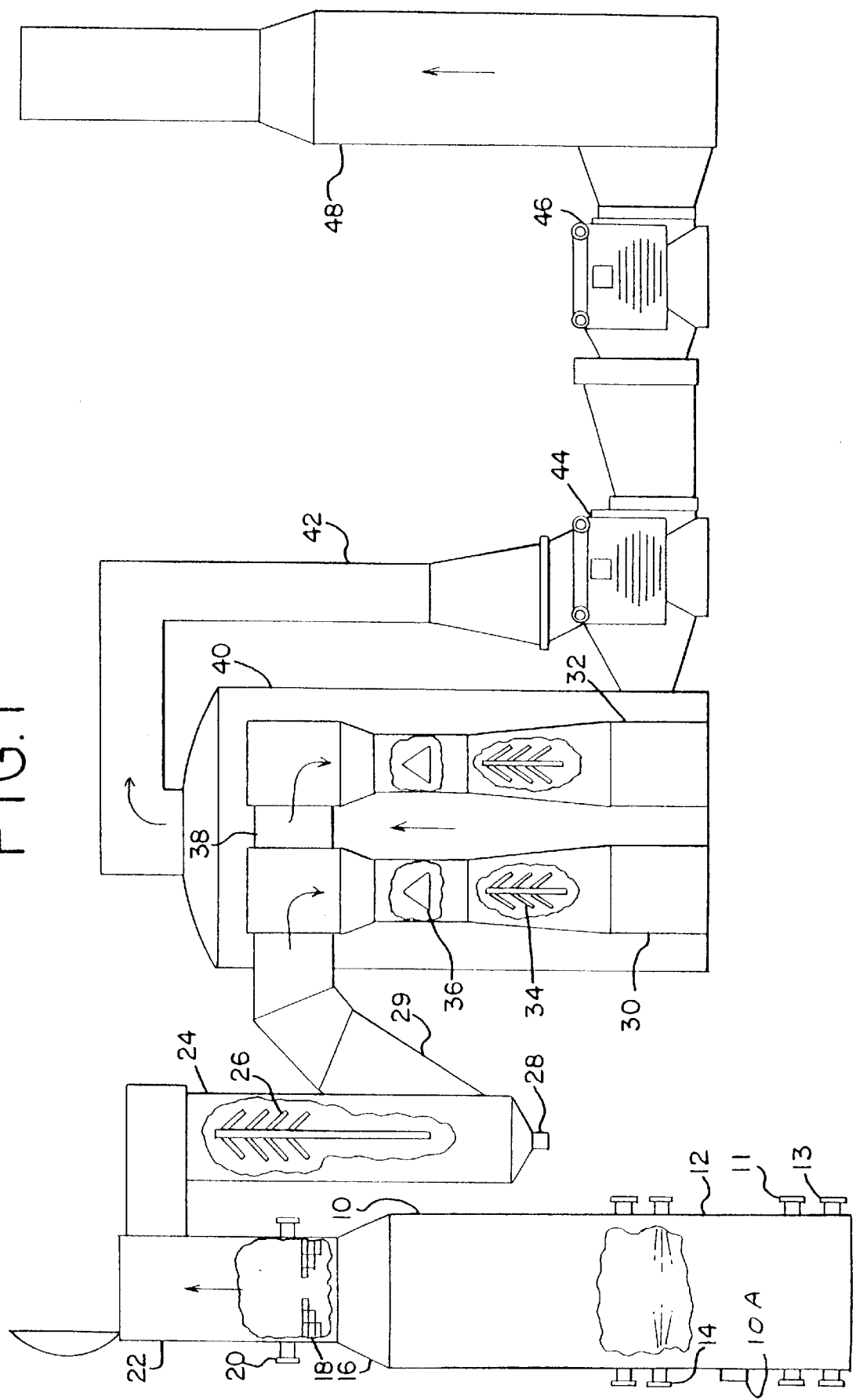
FIG. 1 is a diagram of the cupola and associated emission control equipment.

Referring now to FIG. 1 of the drawings, a schematic diagram of the emission control system in accordance with the present invention is shown. Cupola 10 is a generally cylindrical steel structure that is usually about 8 feet in diameter and about 30 feet tall. Cupola 10 is lined with refractory brick and includes melting area 12 wherein the mixture of coke, iron scrap and limestone is kept at a temperature of about 3000° F. to melt the iron. Melting is accomplished by the combustion of the coke by introduction of hot air through tuyeres 13. Above melting area 12 is a burden area where the charge of iron scrap, coke and limestone is added in batches to keep the melting on a continuous basis. Above this burden area are main afterburners 14 which are the initial portion of the emission control system. Afterburners 14 generally burn natural gas, wherein gas flames are projected inside the cupola refractory lined area to heat the gasses drawn from the cupola melt area and increase them in temperature to near 1650° F. The general draw of air from cupola 10 is provided by main draw fans 44 and 46 which are usually very large motor driven fans each powered by a motor of about 800 horsepower to provide in the neighborhood of 30,000–60,000 standard cubic feet per minute of air draw. The air enters the cupola through various openings such as charge opening 10A and also through tuyeres 13.

Figure 1A:
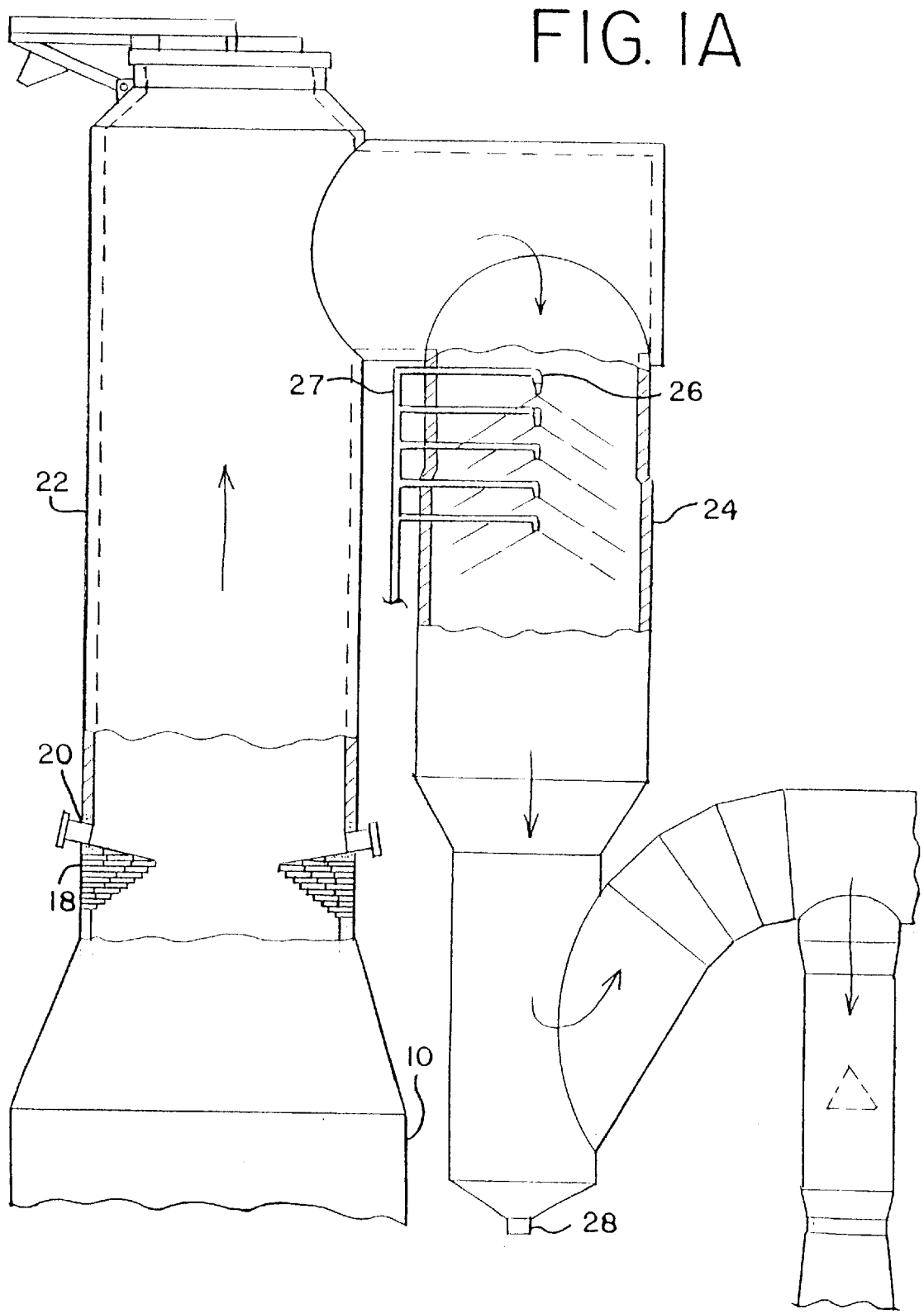
FIG. 1A is a detailed diagram of the cupola upper stack and quencher.

The area of the cupola above main afterburners 14 is referred to as the upper stack of cupola 10 and is about 30 feet in height to provide additional area for combustion of the pollutant gasses given off by the cupola melting operation. The major pollutant of concern is carbon monoxide which is desired to be combusted and thereby converted to carbon dioxide and water vapor. Tapered area 16 of cupola 10 ends with a reduced diameter section which itself has an internally restricted area referred to as orifice ring 18. Orifice ring 18 is shown in greater detail in FIG. 1A and is comprised of refractory brick applied in a tapered manner to form a restricting section that has a diameter of about half the lined diameter of upper stack section 22. The diameter of upper stack section 22 is about 11 feet and the restricted orifice ring 18 diameter is about 5 and one-half feet. The internal surface of the refractory bricks that comprise orifice ring 18 itself becomes lined with slag and other materials that are vaporized in the cupola melt to form a smoother surface on the interior of the tapered section of orifice ring 18.

Above orifice ring 18 are located pilot burners 20 which are shown in greater detail in FIG. 1C. Pilot burners 20 are typically high velocity burners and in this embodiment are two in number. Pilot burners 20 are designed to have the gas flames 21 extend into orifice ring inner diameter 19. Further, gas flames 21 are offset from a direct radial alignment with the radial center of orifice ring 18 so as to provide a further swirling action in the gasses above orifice ring 18.

It is desired to keep the temperature above orifice ring 18 and above pilot burners 20 at about 1650° F. to provide ideal combustion of the carbon monoxide. This mainly occurs in the upper stack section 22 of cupola 10. It is desired to provide adequate time, adequate temperature, and adequate turbulence of the air above orifice ring 18 to provide nearly complete combustion of the carbon monoxide. The temperature is typically provided by the combination of main afterburners 14 and pilot burners 20. The time is provided by the overall height of cupola upper stack 22 above pilot burners 20. Upper stack section 22 typically extends about twenty feet above pilot burners 20. Further, the turbulence to assure complete swirling combustion of virtually all the carbon monoxide gasses exiting or drawn from cupola 10 is largely provided by the design of orifice ring 18. Orifice ring 18 with the construction and restriction to about one-half the diameter of the lined upper stack cupola section 20 assures that the gasses are drawn in a rapid swirling manner to provide proper turbulence such that virtually the entire gas stream is exposed to the gas jets 21 from the pilot burners 20.

The gasses drawn from upper stack section 22 include particulate matter which must be scrubbed from the gas stream to provide proper emission control. However, it is desirable first to reduce the temperature of such gasses from the about 1650° F. combustion temperature to a temperature of the adiabatic saturation temperature (about 165° F.) to allow proper control and handling of such gasses. Such temperature reduction is largely provided in quencher 24. Quencher 24 is largely metal cylinder of about 30 feet in height and includes internal nozzles 26 which are usually five in number and supplied water by external water supply pipe 27. Gasses are drawn downwardly through quencher 24 and must pass through the water dispersion sprays which are provided by nozzles 26. Such sprays are typically at a 120° angle to assure proper impingement or agglomeration of such particles of pollutants which to some degree drop out of the gas stream and are collected through outlet drain 28 at the bottom of quencher 24 for collection and proper treatment and disposal as solid waste.

Gasses drawn from quencher 24 exit through duct 29 and enter header 38 whereby such gasses are drawn downwardly through two identical venturi devices 30 and 32. A detailed description of venturi device 30 will be provided and it will be understood that venturi device 32 is identical to venturi device 30.

Figure 1B:
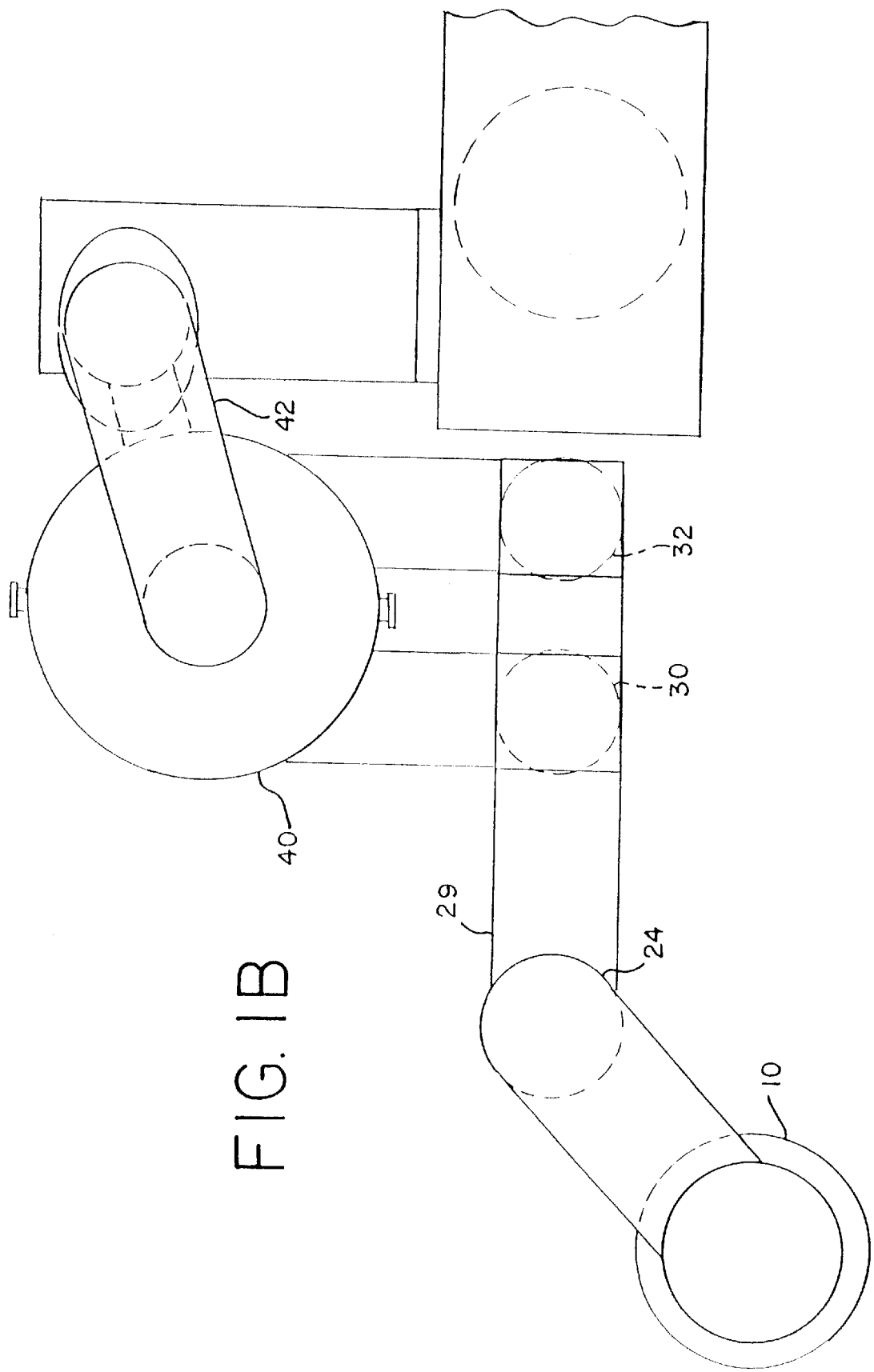
FIG. 1B is an overhead view of the cupola upper stack, quencher, twin venturis, and water separator.

As shown in FIGS. 1 and 1B, venturi device 30 is largely a metallic cylinder of about 40 feet in height. Gasses with particulate contaminants are drawn downwardly through venturi device 30 and are exposed to and drawn through a water curtain from beneath conical section 64. Further, water spray 72 extends upwardly, referring to FIG. 2, through water supply pipe 68 to exit water nozzle 70 and impinge against and be reflected from dispersion cone 64. Dispersion cone 64 is a metallic conical supported by support 66 which itself is moveable vertically through the center of venturi device 30 toward restricted area 62 which is a narrower, lesser diameter section of venturi device 30. Gasses with particulate matter are represented as 74 in FIG. 2 and are drawn downwardly across conical section 64. Accordingly, such gasses must pass through water spray 72 exiting from supply header 70. Particles of such gasses are agglomerated or impinged and fall out from venturi device 30 in the major scrubbing and particulate removal operation of the emission control system. This is the major function of venturi device 30. Such materials exit the bottom of venturi device 30 and are collected and properly disposed of as solid waste.

It should be understood that venturi device 30 also accomplishes an air restriction function. Conical support 66 is moveable vertically such that conical section 64 can impinge near reduced diameter section 62 of venturi device 30. Such impingement reduces the air flow 74 downwardly through venturi device 30 and accordingly reduces the air drawn into cupola charge opening 10A. Thusly it is possible by the single or usually preferable parallel operation of venturi devices 30 and 32 with their identical conical impingement devices 64 to control the air drawn into cupola charge opening 10A by operation of the conical impingement device 64. Such operation provides the major control over temperature in the upper stack sections 22 of cupola 10. Pilot burners 20 are typically operated in a manner without adjustment. Accordingly, when it is desired to adjust the temperature in upper cupola stack section 22, the simplest and most ready adjustment for such temperature to assure the proper combustion of carbon monoxide at near 1650° is by the adjustment of conical impingement devices 64 within venturi device 30, with the understanding that there is an identical parallel operated device within venturi device 32. It should be understood that venturi device 30 provides the effect of a high energy scrubber in that the pressure drop through the venturi is about 65 inches of water. This pressure creates the energy to cause such particles of contaminants to be wetted by the water curtain formed by the spray impinging the bottom side of conical section 64. Such wetting action causes the particulate to become heavier and then separate from the gas stream by a reversal of direction of air flow. The air contaminants drawn downwardly through such water curtain causes such particles within such air stream to be drawn downwardly as a sludge for proper collection and disposal.

Referring now to FIGS. 1, 1D and 1E, water separator 40 is shown as the device receiving the now scrubbed air stream from venturi devices 30 and 32. Water separator 40 itself is a large cylindrical metallic structure of about 16 feet in diameter and about 40 feet in height. The purpose of water separator 40 is largely to remove water droplets from the air stream drawn from venturi devices 30 and 32 and to also further cool the air stream from about 165° F. to about 100° F. prior to entering main draw fans 44 and 46.

Water separator 40 includes two nearly identical screened sections 58 and 60. Screened section 58 is formed by circular screen structures 50 and 52 forming the top and bottom of screened section 58. Screened section 58 itself is comprised of hundreds of multi-opening large surface area structures 62. Such structures are about the size of a regular soda 20 can and are usually comprised of plastic. The purpose of such structures within packing layer 62 is to provide a large degree of surface area such that the air drawn into the bottom of water separator 40 passes through packing section 58 contacts the many surfaced area layers of packing 62 and accordingly water droplets are agglomerated on the multi-surfaced area of packing 62 and drop out into a collection drain from water separator 40. Upper packing layer 60 is identical to the first packing layer 58 in that it comprises a screen bottom 54 and a screen top 56 and is comprised again hundreds of pieces of packing 62. A large volume of water sprayed through sprays 57, 59 onto upper packing layer 60 causes a temperature reduction in the air stream. Incoming air at about 165° F. is reduced to about 100° F. before exiting water separator 40 at exit duct 42. Air exiting water separator 40 is denser due to low temperature and low humidity.

The now scrubbed and temperature reduced air stream enters main draw fans 44 and 46 which are described as above are large radial fans driven by usually large horsepower motors in the neighborhood of 800 horsepower. These series connected fans provide a draw of 30,000 to 60,000 standard cubic feet per minute of gasses exiting cupola 10 and entering opening 10A and tuyeres 13 through ducting 42 into main draw fans 44 and 46 and finally out cupola stack 48. A single larger horsepower motor device fan could accomplish the same result. It should be understood that damper air flow control device 47 can be present in the ducting for either draw fan.

Figure 4:
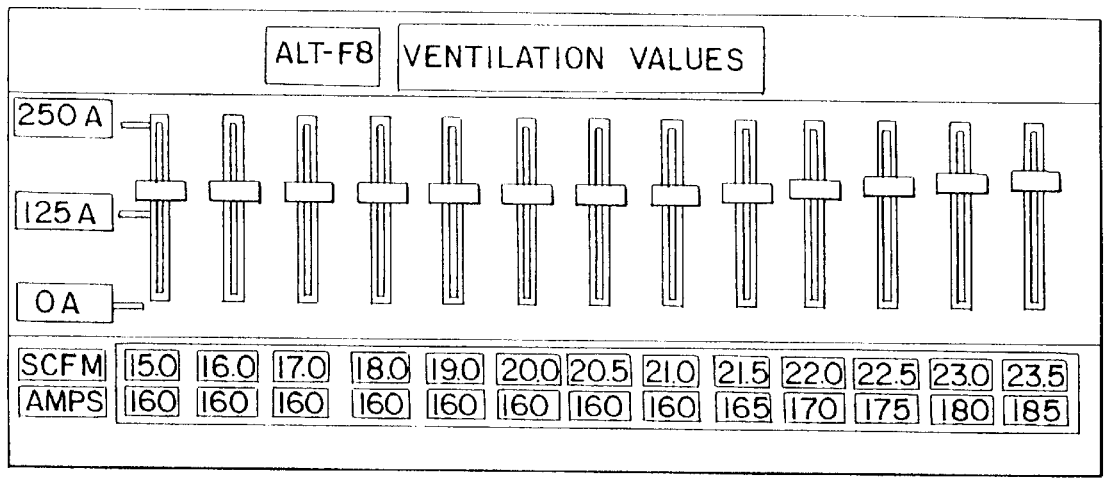
FIG. 4 is a diagram of the computer screen showing the main draw fan operating parameters.
Figure 5:
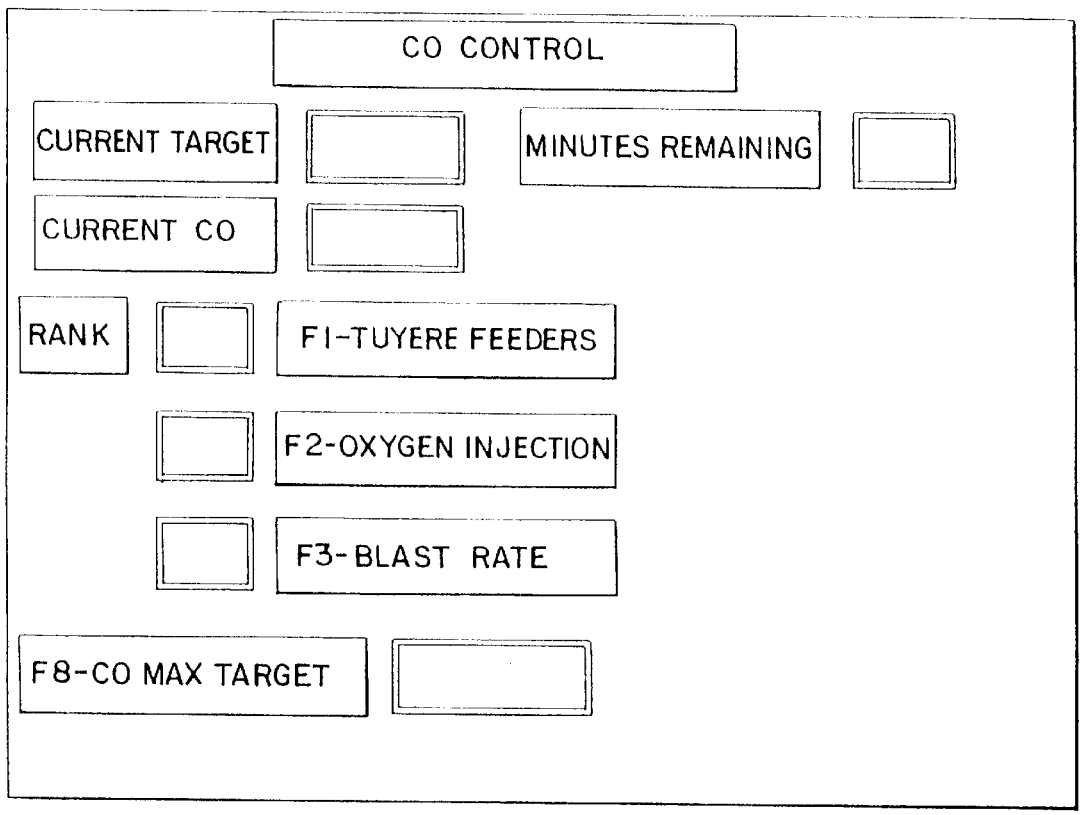
FIG. 5 is a diagram of the computer screen showing the carbon monoxide current levels and adjustment parameters.

Referring now to FIGS. 3, 4 and 5 of the drawings, various controlled set points are shown that are utilized to control the cupola emission system of the present invention. As shown in FIG. 3, the ideal temperature set point for carbon monoxide combustion in upper cupola section 22 is 1650° F. Accordingly, venturis 31 and 32 are set to operate at such a temperature. The setting for venturi opening position is shown as venturi minimum position in FIG. 3. Referring to FIG. 4, cupola tuyere air is shown in standard cubic feet per minute. It is seen that the standard cubic feet per minute can vary between 15,000 and 23,500. It is desired to melt as high a rate of iron as possible, and accordingly draw fans are typically each operated at 185 amps to provide about 50,000 standard cubic feet per minute. It is understood that the standard cubic feet per minute numbers shown in FIG. 4 are times one thousand.

As is explained above, the venturi position referenced in FIG. 3 is physically shown in FIG. 2 as the position of conical section 64 extending into restricted diameter section 62 of venturi device 30. Further, both venturis are shown in FIG. 3, and as further explained above, conical sections 64 are operated in parallel to adjust the draw air pulled from cupola through venturi devices 30 and 32. Typically the amperage value in cubic feet per minute of tuyere air is tied to the desired melt rate of cupola 10. As shown in FIG. 4, it is virtually almost always desired to operate the cupola at a maximum melt rate and accordingly draw fans 44 and 46 are almost always operated at a maximum amperage for the maximum draw of 50,000 standard cubic feet per minute.

However, when indications are that the temperature in upper cupola stack varies from 1650° F., the venturi conical section 64 position is automatically adjusted through a control feedback loop to be described in detail later to adjust the draw of air through cupola 10 and accordingly adjust the temperature in upper cupola stack 22 to be kept near the ideal carbon monoxide combustion temperature of 1650° F.

Referring now to FIG. 5, the control of carbon monoxide is typically accomplished by measuring the value of carbon monoxide in exhaust stack 48. Again, the carbon monoxide emission value is compared to a target value, and the emissions of carbon monoxide are typically adjusted by varying the fuel in the form of coke and other materials added through tuyere feeder 11, varying the oxygen injection rate into cupola 10 or varying the blast rate of hot air through supply 13 into cupola 10. The various injection devices are shown in FIG. 1.

Figure 6:
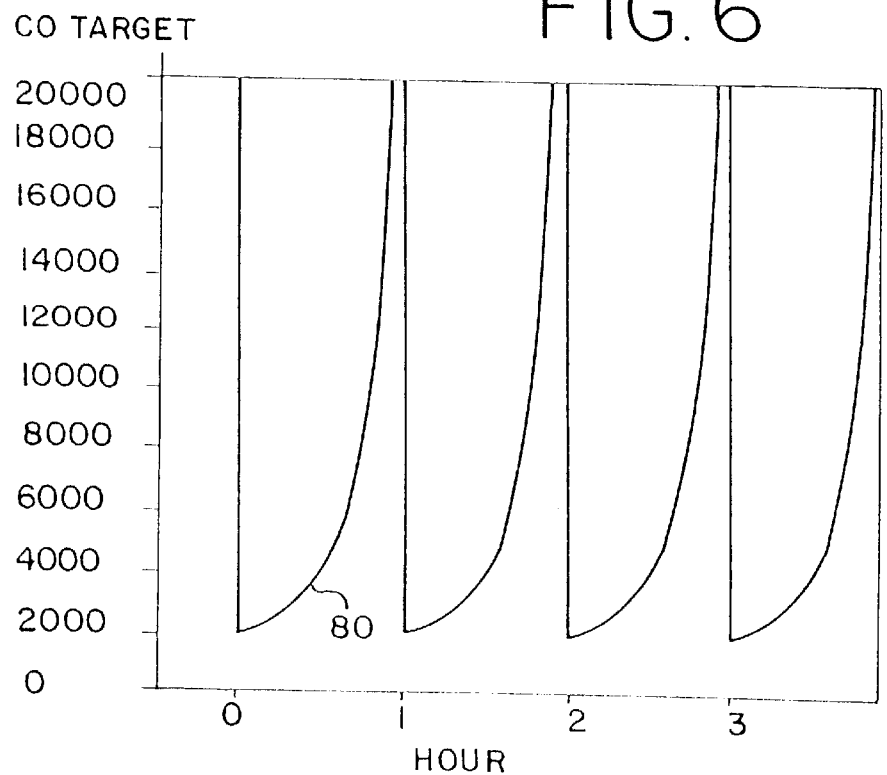
FIG. 6 is a diagram of sample calculated carbon monoxide target values versus time.
Figure 7:
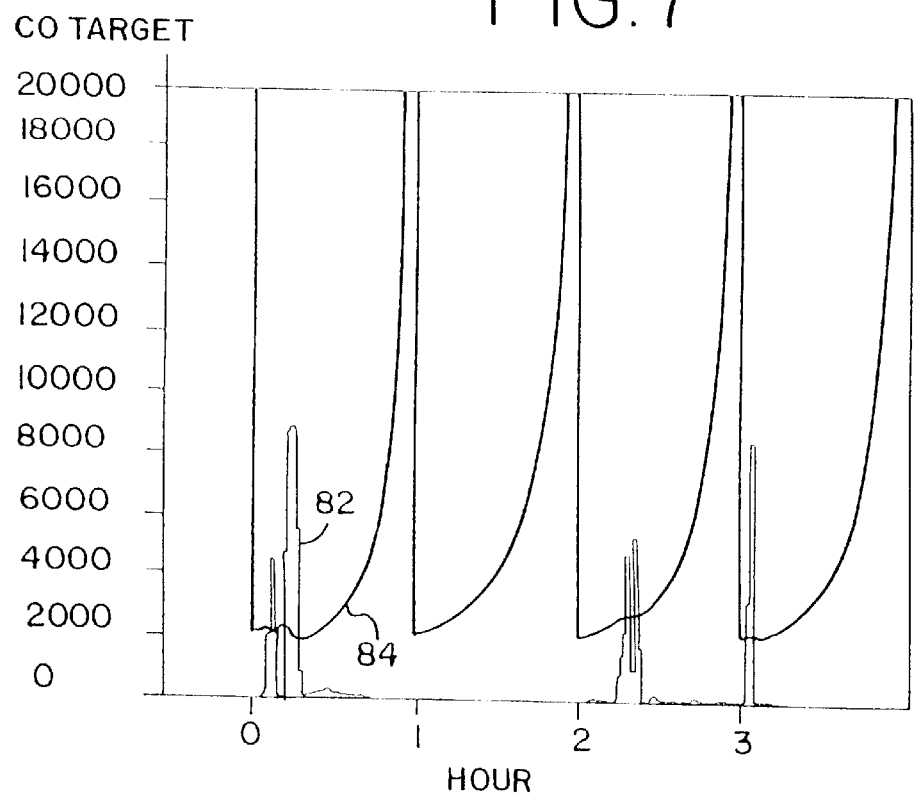
FIG. 7 is a diagram of an example of carbon monoxide target values adjusted by actual carbon monoxide readings versus time.

Referring now to FIGS. 6, 7, and 8, an explanation of the control of carbon monoxide in calculation of carbon monoxide target values will be now be provided. It should be understood that the operating permit for cupola 10 includes an hourly block carbon monoxide emission value. The emission value is measured each minute by averaging six readings taken every ten seconds of carbon monoxide discharge at emission stack 48. An average of such readings is displayed as a one minute value. Such emission value is displayed as current CO in FIG. 5. The permit limit for carbon monoxide in this explanatory example is 2500 parts per million on a one hour blocked average. Of course other permit values for carbon monoxide or other permitted pollutants could follow this same example. To evaluate the remaining units of carbon monoxide emissions left in the fraction of an hour remaining, a target carbon monoxide emission value is calculated by multiplying the number of minutes remaining in each hour times the carbon monoxide permit limit. For example, at the beginning of each hour, 60×2500=150,000 units of carbon monoxide are available for the one hour block period that is beginning. At the end of the first minute, a certain actual CO value will be read. This value would be subtracted from the 150,000 units remaining and a next remaining value for the 59 minutes remaining in the one hour block would be calculated by dividing the number of carbon monoxide units left by the 59 minutes remaining to create a new target CO emission level. For example, if in the first minute the reading of carbon monoxide emissions is 1000, this would leave 149,000 units of carbon monoxide left for the remaining 59 minutes. So for the next 59 minutes, the system could operate at 149,000 divided by 59 or at 2525 parts per million carbon monoxide per minute. Accordingly, proper adjustments can be made as will be described later to the tuyere feeders, to the oxygen injection through the tuyeres and to the blast rate to actual operate the cupola at a higher rate because additional amounts of carbon monoxide may be emitted within the one hour block period and still be within permitted emission values.

As another example, if in the first minute a 5000 reading is obtained for carbon monoxide, then only 145,000 units of carbon monoxide emissions would be allowable in the remaining 59 minutes of the one hour block permit period. This equals 2458 parts per million of carbon monoxide that could be emitted as an average per minute over the next 59 minutes. Accordingly, the system would no longer be able to operate at the regular permitted level of 2500 parts per million, but would rather have to adjust the tuyere feeder operation, the oxygen injection rate and possibly the blast rate to lessen the carbon monoxide generation by decreasing the operation rate of the cupola to assure that carbon monoxide emissions were below the 2458 new target level which would be shown as current target after the first minute of operation in FIG. 5.

This calculation is also shown in FIG. 6 which is a straight forward calculation of remaining CO target levels for block one hour operation at below the target value of 2500. As noted from looking at FIG. 6, the allowable emission value of carbon monoxide would increase for the remaining minutes of each one hour block permit period to allow greater and greater emissions of carbon monoxide but still be below the one hour block average allowable amount.

It should be understood, that if emissions were at the allowable level of 2500 and the readings each minute were at 2500, the target value would remain at 2500 for each minute remaining in the one hour block. For example, if the system operated at 2500 for the first two minutes of the one hour block period, a total of 5000 units would be expended. The total value of carbon monoxide units in the one hour would be 150,000 less the 5000 emitted during the first two minutes, leaving 145,000 units to be emitted during the remaining 58 minutes of the one hour block period. Such value expressed per minute is 145,000 divided W by 58 which equals 2500 and which remains the target value. However, in real operations, for each minute that passes a new target would be calculated based on the past minute's average emissions. For example, referring to FIG. 7, it is seen that actual operation is shown as a spiked graph 82 whereas target value would be the generally smooth exponential graph 84. It should be noted in comparing target value 84, that depending on the actual spike value reading of carbon monoxide emissions at 82, the target value can actually decrease as shown at the beginning of the large spike in actual CO emissions at 82, where it is noted that the target value 84 actually decreases to a lower amount.

Referring now to FIG. 8, demand limiting carbon monoxide emissions over a one hour period is shown as an example operation reading. For example, if in the first minute the actual CO reading is 500, this leaves 149,500 units left for the remaining 59 minutes of the hour. Accordingly, 149,500 divided by 59 equals 2534, which is an allowable reading higher than the permitted amount of 2500, but will still allow compliance with the one hour blocked average if the average CO emitted per minute over the remaining 59 minutes equals 2534. As seen continuing into the next minute, if another 500 unit is read in the second minute, this leaves 149,000 units left for the remaining 58 minutes of the hour, which increases the allowable average CO emissions per minute further to 2569 parts per million. This continues varying minute by minute until fairly large actual readings are shown in the example beginning with 34 minutes remaining in the hour when actual CO readings increase to 10,000. Accordingly, the CO total amount remaining decreases rapidly and as can be seen with 31 minutes remaining, the allowable CO emission for the remaining one hour blocked average decreases below the permissible limit of 2500 in order to maintain compliance with the one hour block average. This number decreases in this example more so to a point that with 20 minutes remaining, it is indicated in the explanation on the drawing that the cupola should have been allowed to go to spill in order to remain compliant with the one hour block carbon monoxide permit levels. The meaning of the term put the cupola to spill involves shutting of all four tuyere feeders from all input of powdered coke, other fuel and alloy materials and hot air, to turn off oxygen injection completely through the tuyeres and also to reduce or shut the blast rate of hot air in order to no longer be melting additional iron but to just keep the molten iron in place in the cupola. This reduces carbon monoxide emissions to an absolute minimum and would allow the one hour block permit average to be maintained. As indicated with 9 minutes remaining, with the emission rate of 2500, and only 2150 carbon monoxide units remaining, the one hour block average was exceeded and the permit limit would have been exceeded.

Figure 9:
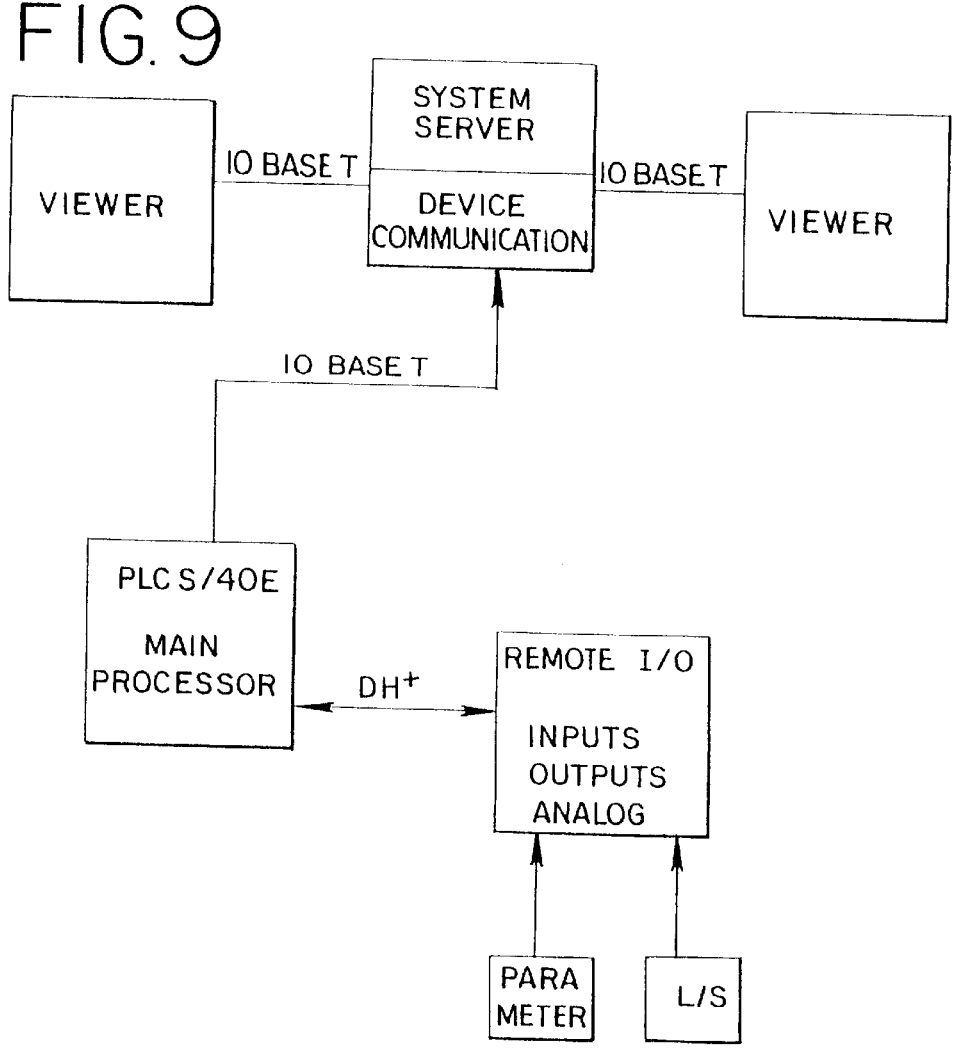
FIG. 9 is a system diagram of a parameter collection and control system in accordance with the present invention.

Referring now to FIG. 9, a block process diagram is presented representative of the cupola emission control system of the present invention. Inputs of operating parameters are shown as the mili-amp input representative of operating parameters. Examples of such signals could be the temperature in upper cupola stack 22 or the amount of carbon monoxide emissions in exhaust stack 48. Such signal is received by a remote output device and sent to a main processor also referred to as a PLC or programmable logic controller. Such signal representative of the operating parameter may also be sent to a system server for processing or comparison to stored values. The values from the programmable controller or system server may be shown in viewers indicated on FIG. 9 as well. In turn, signals can be sent from the system server or the main processor or programmable logic controller through the remote input output device to actual control valves or similar devices to adjust operating parameters.

Figure 10:
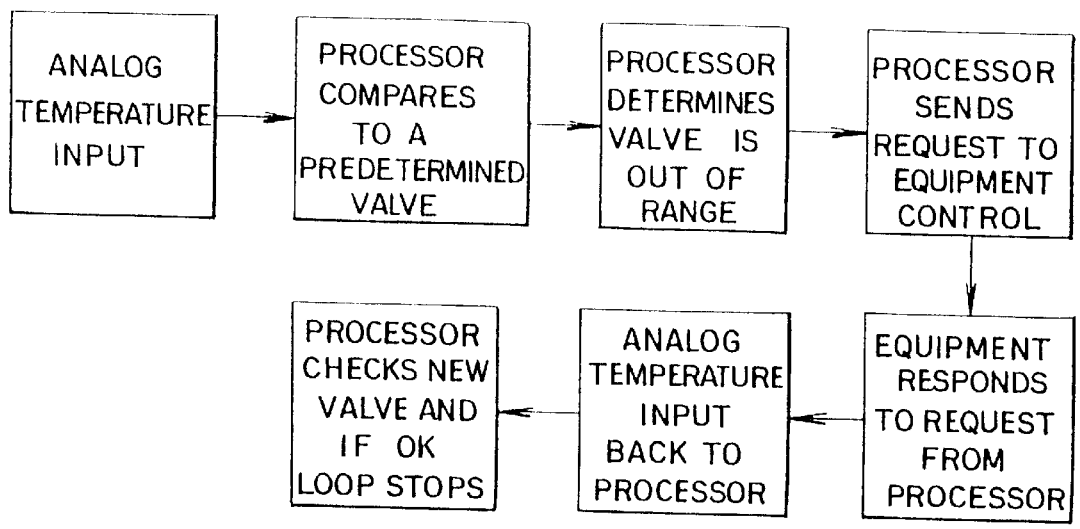
FIG. 10 is a system block diagram of the control system signal processing in accordance with the present invention.

Referring now to FIG. 10, an example of such a modification of an operating parameter is shown in block format.

An analog signal representative of an operating parameter such as upper stack temperature is input to the programmable logic controller or system server. The processor or server compares such signal to a predetermined value and determines if the value is out of an acceptable range. If indeed the value is out of the acceptable range, the server or programmable logic controller sends a request to an equipment control device such as a valve to modify an operating parameter. The control equipment modifies the operating parameter by a predetermined amount, and a new analog signal representative of the new operating parameter is measured and again sent back to the processor or server. Once again the processor or server compares the new value to a predetermined value and if the new value is within an acceptable range, no further action nor signal is given. However, if the value is out of the acceptable range, the control loop is begun again wherein an adjustment is made of an incremental amount of a predetermined value and again the reading is once again taken, and additional adjustments may be accomplished in a similar manner.

Figure 11:
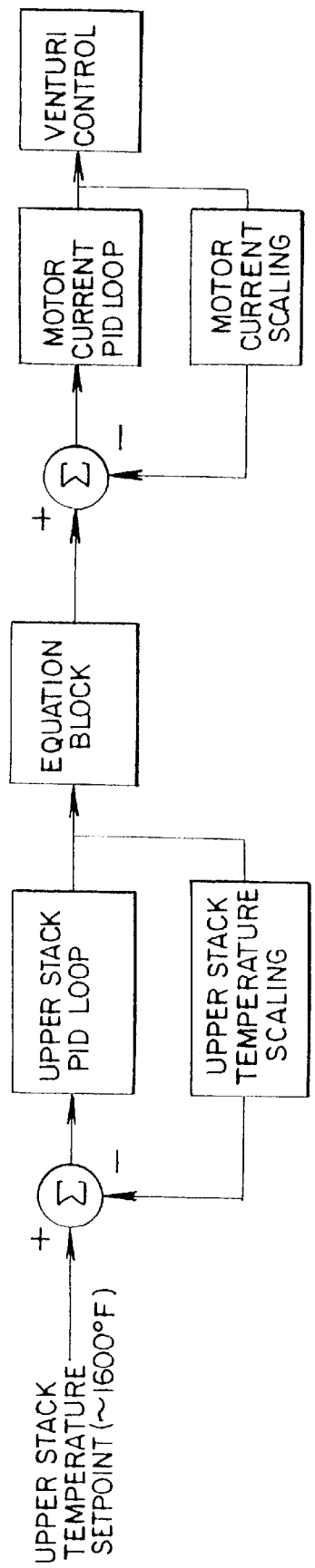
FIG. 11 is a system control diagram showing a system parameter adjustment in accordance with the present invention.

Referring now to FIG. 11, a similar processing control loop is shown as recording a signal representative of an upper stack temperature in the upper cupola section 22. This would be compared to the desired upper stack temperature of 1650° F., if indeed the temperature was within an acceptable range, no further action would be taken. However, if the difference was greater than an acceptable amount, control signals would be sent to a control device to adjust the venturi device cone to adjust the air draw through the venturis and accordingly through the cupola. Such adjustment would either increase air flow to decrease the temperature in the upper stack or decrease air flow to increase the temperature in the upper stack to keep it within the acceptable range of the desired operating temperature of 1650° F.

Another example of the processor control use would be to accept a signal of the actual carbon monoxide emissions through exhaust stack 48. If such signal were at or below within a predetermined selected amount of the allowable emission rate of 2500 parts per million carbon monoxide. The carbon monoxide measured at exhaust stack 48 were greater then the per minute allowable rate of 2500, than a comparison would be made along the lines of FIG. 8 to determine a new target value of carbon monoxide emissions. Appropriate control signals would be sent to, in turn, the tuyere feeders, the oxygen injection rate through the tuyere feeders and the blast rate to lessen the iron melt rate to decrease carbon monoxide emission. If the carbon monoxide measured at exhaust stack 48 were less than the per minute allowable rate of 2500, then a comparison would be made along the lines of FIG. 8 to determine a new target value of carbon monoxide emissions. Appropriate control signals would be sent to, in turn, the tuyere feeders to limit input of powdered coke, fuel and alloy materials, the oxygen injection rate through the tuyeres and the blast rate to increase the iron melt rate to increase carbon monoxide emissions.

What is claimed is:

1. A cupola emission control system comprising
   a cupola having a charge holding area,
   main afterburners located above said charge holding area of said cupola,
   an orifice ring in said cupola above said main afterburners,
   pilot burners in said cupola above said orifice ring,
   a quenching device connected to draw high temperature combusted air from said cupola above said pilot burners and to lower the temperature of such air by impinging a water spray onto such air as it passes through said quenching device,
   at least one venturi device connected to draw air from said quenching device,
   at least one main draw fan connected to draw air from said cupola and through said quenching device and through said venturi device,
   wherein said orifice ring restricts the diameter of said cupola above said pilot burners,
   and said venturi device controls the amount of air drawn into said cupola thereby controlling the combustion temperature above said orifice ring,
   a water separator device connected to receive air from said venturi device,
   said water separator device comprising a structure having two internal layers of packing each comprising numerous multi-surfaced structures,
   a first of said two internal layers of packing offering surface area of said numerous multi-surfaced structures sufficient to cause a majority of water in said air from said venturi device to be removed from air passing through said water separator device,
   and a second of said two internal layers of packing offering surface area of said numerous multi-surfaced structures sufficient to reduce the temperature of said air from said venturi device.

2. The cupola emission control system of claim 1 further comprising a water spray device within said water separator device.

3. The cupola emission control system of claim 2 wherein said water spray device is located above said first and second internal packing layers.

4. The cupola emission control system of claim 1 wherein said orifice ring comprises layers of refractory material extending inwardly from upper walls of said cupola to form a restricted diameter section within said upper walls of said cupola.

5. The cupola emission control system of claim 1 wherein said orifice ring comprises layers of refractory brick extending inwardly from upper walls of said cupola to reduce the diameter of said upper walls of said cupola to a restricted generally circular opening about one-half the diameter of said upper walls of said cupola.

6. The cupola emission control system of claim 1 wherein said orifice ring comprises layers of refractory brick extending inwardly from upper walls of said cupola in a tapered manner from a lower section of said orifice ring to an upper section of said orifice ring to form a restricted generally circular opening about one-half the diameter of said upper walls of said cupola.

7. The cupola emission control system of claim 4 wherein said pilot burners are at least two in number and are positioned near said upper walls of said cupola such that a gas flame from each of said pilot burners extends radially into said restricted diameter section within said upper walls of said cupola.

8. The cupola emission control system of claim 4 wherein said pilot burners are two in number and are positioned near said upper walls of said cupola at a small angle from radial alignment with a center point of said cupola such that a gas flame from each of said pilot burners extends radially into said restricted diameter section within said upper walls of said cupola.

9. The cupola emission control system of claim 4 wherein said orifice ring forms a restricted diameter section within said upper walls of said cupola in a manner such that air flow above said orifice ring is turbulent.

10. The cupola air emission control system of claim 1 wherein said venturi device comprises a generally cylindrical cone shaped impinging head fitted on an end of a moveable support and a restricting section within said venturi device, such that upon movement of said support and said impinging head toward said restricting section the movement of air through said venturi device is restricted and upon movement of said support and said impinging head away from said restricting section the movement of air through said venturi device is increased.

11. The cupola emission control system of claim 10 wherein said venturi device comprises two identical units that operate in parallel.

12. The cupola emission control system of claim 10 further comprising a water discharge within said venturi device causing a water screen within said venturi device, whereby said air drawn through said venturi device passes through said water screen and is thereby scrubbed of particles.

13. The cupola emission control system of claim 10 wherein said venturi device is a generally cylindrical structure having a first internal diameter and that said restricting section of said venturi device is of a second diameter smaller than said first internal diameter such that airflow through said restricting section is at a velocity higher than the velocity of air through the section of said venturi device of said larger first internal diameter.

14. A method of controlling emissions from a cupola comprising the steps of
sensing an emissions value and converting said emissions value to a first signal representative of said emissions value,
comparing said first signal to a calculated value representative of an acceptable range of emission values,
sending a second signal to a control device to modify an operating parameter by a predetermined amount to adjust said emissions value, if said first signal of said emissions value is outside said acceptable range,
sensing a new emissions value and converting said new emissions value to a second signal representative of said new emissions value,
comparing said second signal to said predetermined value representative of an acceptable range of emissions values,
and, if said new emissions value is outside said acceptable range, sending another signal to said control device to modify said operating parameter by a predetermined amount to adjust said emissions value or, if said new emissions value is within said acceptable range, not sending a signal to said control device.

15. The method of controlling emissions of claim 14 wherein said emissions value is carbon monoxide and said control device modified operating parameter is tuyere fed materials.

16. The method of claim 14 wherein said emissions value is carbon monoxide and said control device modified operating parameter is tuyere fed oxygen injection.

17. The method of claim 14 wherein said emissions value is carbon monoxide and said control device modified operating parameter is hot blast air.

18. The method of claim 14 wherein said emissions value is carbon monoxide and said control device modified operating parameter is upper stack temperature.

19. A method of controlling carbon monoxide emissions from a cupola comprising the steps of
providing a cupola a charge holding area and with main afterburners above said charge holding area,
providing a quenching device connected to draw high temperature combusted air from said cupola above said main afterburners to lower the temperature of such combusted air with an impinging water spray,
providing at least one air flow control device connected to draw air from said quenching device,
at least one main draw fan connected to draw air from said cupola and through said quenching device and through said air flow control device,
sensing a temperature value in an upper area of said cupola above said main afterburners and converting said temperature value to a first signal representative of said temperature value,
comparing said first signal to a predetermined value representative of an acceptable range of temperatures, and if said temperature value is outside of said acceptable range of temperatures,
sending a second signal to a said air flow control device to modify the amount of air drawn through said cupola to modify the temperature in said upper area of said cupola.

20. The method of claim 19 further comprising
providing an orifice ring of restricted diameter within said cupola above said main afterburners.

21. The method of claim 19 further comprising
providing pilot burners within said cupola above said orifice ring.

22. A method of controlling emissions comprising the steps of
calculating a remaining quantity of emission units for an allowed time period,
measuring an actual emissions value of an allowed pollutant,
and calculating a new remaining quantity of emission units for a remaining time period.

23. The method of controlling emissions of claim 22 further comprising the steps of
measuring a new actual emissions value of an allowed pollutant,
comparing said new actual emissions value with said new remaining quantity of emission units for said remaining time period and adjusting an operating parameter to modify actual emissions of said allowed pollutant if said new actual emissions value projects an excess or a deficit in said remaining quantity of emission units for said remaining time period.

24. The method of controlling emissions of claim 23 wherein
the remaining quantity of emission units are calculated by multiplying a permitted quantity of said allowed pollutants by the time units remaining in said allowed time period.

25. The method of controlling emissions of claim 23 wherein said allowed pollutant is carbon monoxide and said allowed time period is one hour provided in 60 minute time units;

calculating an initial total quantity of emission units by multiplying a permitted quantity of said allowed pollutant by said allowed time period, which initial total quantity is a reference value;

monitoring said emission units for a time unit to provide said actual emissions value of said pollutant for said time period;

subtracting said actual emissions value for said time unit from said reference value to define a new reference value for said total quantity of emission units after expiration of a time unit;

reducing said initial allowed time period by the expired time unit to define said remaining time units;

providing a ratio between said new reference value and said remaining time units to define a new emissions unit;

comparing said monitored actual emissions value for said time unit to said new emissions unit, and determining an adjustment requirement to an operating parameter to provide one of increasing, decreasing and maintaining said actual emissions of said carbon monoxide;

checking said remaining time for a value greater than zero, and resetting said allowed time and reference value for a new allowed period at remaining time equal to zero;

initializing said new reference value as said reference value;

monitoring said actual emissions units for each said time unit for said allowed time period and iterating each successive steps after said first noted monitoring step for said allowed time period.

26. The method of claim 25 wherein said operating parameter to be adjusted is tuyere fed materials.

27. The method of claim 25 wherein said operating parameter to be adjusted is tuyere fed oxygen injecting.

28. The method of claim 25 wherein said operating parameter to be adjusted is hot blast air.

* * * * *